United States Patent [19]
Ikemori et al.

[11] Patent Number: 4,687,302
[45] Date of Patent: Aug. 18, 1987

[54] ZOOM LENS

[75] Inventors: Keiji Ikemori; Tsunefumi Tanaka, both of Kanagawa; Masatake Kato, Tokyo, all of Japan

[73] Assignee: Canon Kabushiki Kaisha, Tokyo, Japan

[21] Appl. No.: 903,901

[22] Filed: Sep. 4, 1986

Related U.S. Application Data

[63] Continuation of Ser. No. 613,583, May 23, 1984, abandoned.

[30] Foreign Application Priority Data

Jun. 1, 1983 [JP] Japan .................................. 58-97178
Jul. 29, 1983 [JP] Japan .................................. 58-140002

[51] Int. Cl.⁴ ............................................ G02B 15/14
[52] U.S. Cl. ................................................ 350/427
[58] Field of Search ................................ 350/427, 423

[56] References Cited

U.S. PATENT DOCUMENTS 3,975,089  8/1976  Betensky .............................. 350/427
4,306,776  12/1981  Someya .............................. 350/427

Primary Examiner—John K. Corbin
Assistant Examiner—Rebecca D. Gass
Attorney, Agent, or Firm—Toren, McGeady & Associates

[57] ABSTRACT

A zoom lens comprising, from front to rear, a negative first component, a positive second component, a positive or negative third component and a positive fourth component. To effect zooming, the first, second and third components are made to axially move in differential relation to each other. This makes it possible to achieve a minimization of the bulk and size of the entire system and a valuable increase in the angle of view field for the wide angle setting.

11 Claims, 16 Drawing Figures

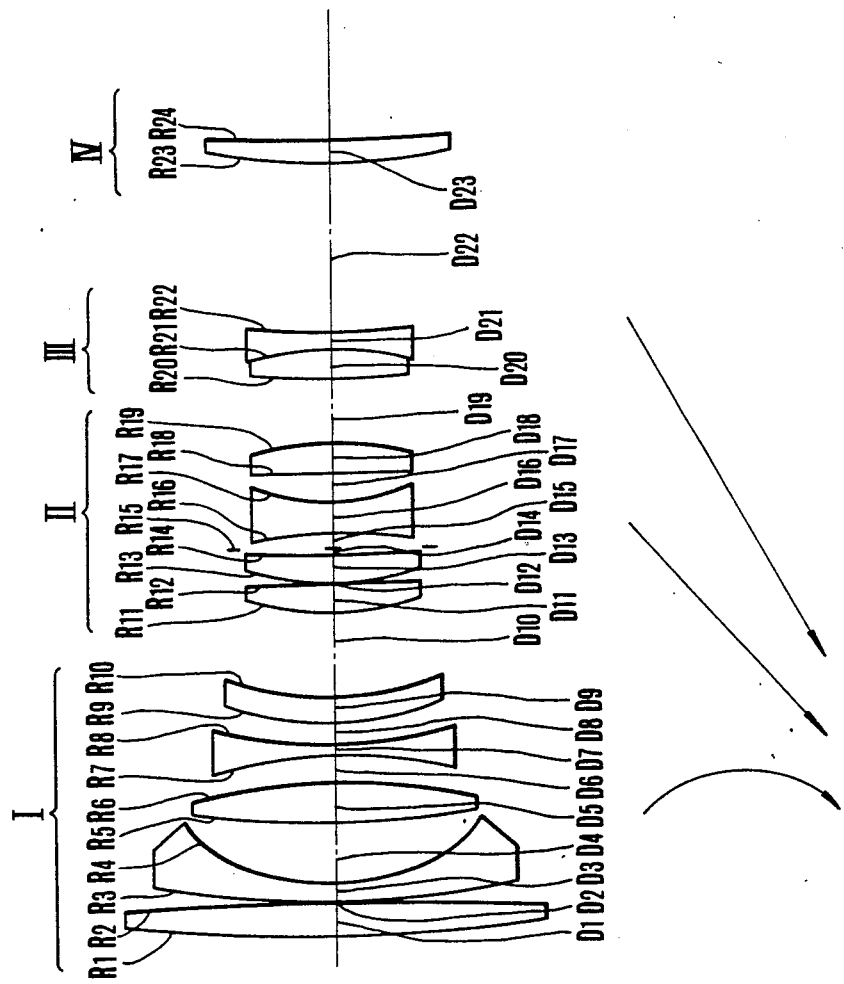

FIG.5(a)
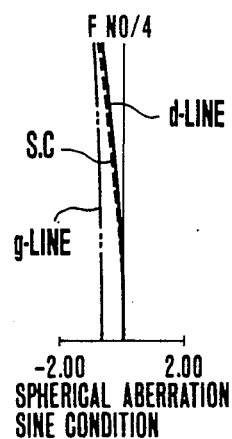
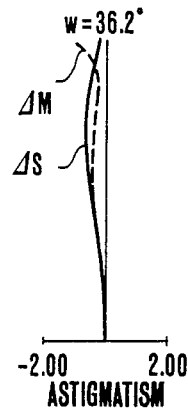
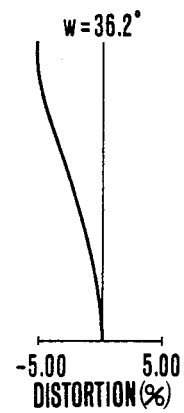
FIG.5(b)
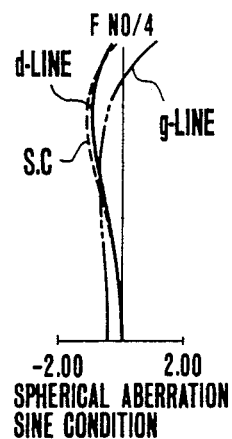
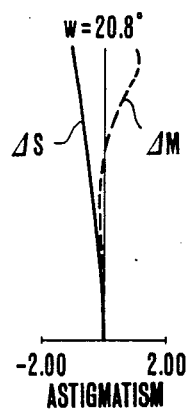
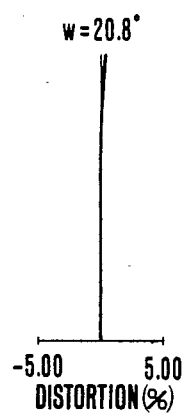
FIG.5(c)
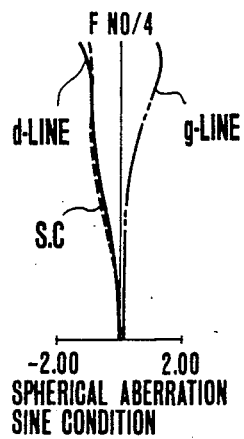
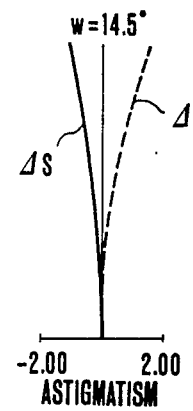
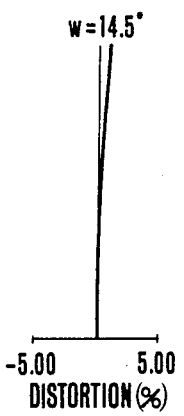

ZOOM LENS

This is a continuation of application Ser. No. 613,583, filed May 23, 1984 now abandoned.

BACKGROUND OF THE INVENTION

1. Field of the Invention

This invention relates to negative component preceding zoom lenses, and, more particularly, to zoom lenses of a range beginning with a focal length equal to or shorter than the focal length of the standard lens for 35 mm single lens reflex cameras and a zoom ratio of 2:1 to 3:1 or thereabout.

2. Description of the Prior Art

There have been previous proposals for the 3-component zoom lens with the negative first, positive second and negative or positive third components, counting from the front; all of which are made to axially move in differential relation to each other to effect zooming, as, for example, disclosed in British Pat. No. 398,307, and Japanese Laid-Open Patent Applications Nos. SHO 54-26754, SHO 57-5023, and SHO 56-158316. These zoom lenses are amenable to a higher magnification range than that of the 2-component zoom lens of which the front is of negative power and the rear is of positive power, and, moreover, facilitate somewhat of a compact form. To achieve either a further reduction of the bulk and size of the entire system, or a much-desired increase in the widest angular field, however, the refractive power of each component must be strengthened with good stability of correction of all aberrations throughout the zooming and focusing ranges (when focusing is performed by the first component) being sacrificed. It has, therefore, been very difficult to realize a 3-component zoom lens of increased relative aperture and a higher grade imaging performance. Particularly with the first component having strengthened refractive power, variation of aberrations with focusing and zooming tends to increase. Also, with the second component having strengthened refractive power, variation of aberrations with zooming tends to increase.

SUMMARY OF THE INVENTION

It is an object of the present invention to provide a zoom lens which enables a further reduction of the bulk and size and a much-desired increase in the angular field for the wide angle settings to be achieved while maintaining good stability of aberration correction throughout the focusing and zooming ranges.

Other objects of the invention will become apparent in pursuit of the following description of embodiments thereof.

BRIEF DESCRIPTION OF THE DRAWINGS

FIG. 4 is a longitudinal section view of a numerical specific example 4 of the lens based on the second embodiment of the invention.

FIGS. 5(a), 5(b) and 5(c) are graphic representations of the various aberrations of the lens of FIG. 1 in the wide angle, intermediate and telephoto positions respectively.

DETAILED DESCRIPTION OF THE PREFERRED EMBODIMENTS

Figure 1:
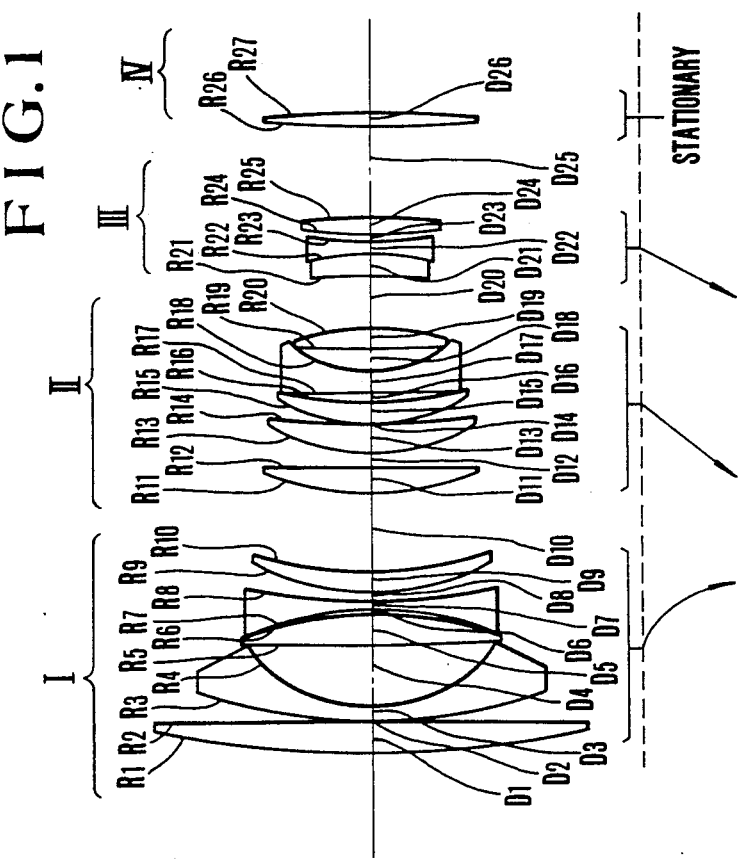
FIG. 1 is a longitudinal section view of a numerical specific example 1 of a lens based on a first embodiment of the invention.
Figure 2:
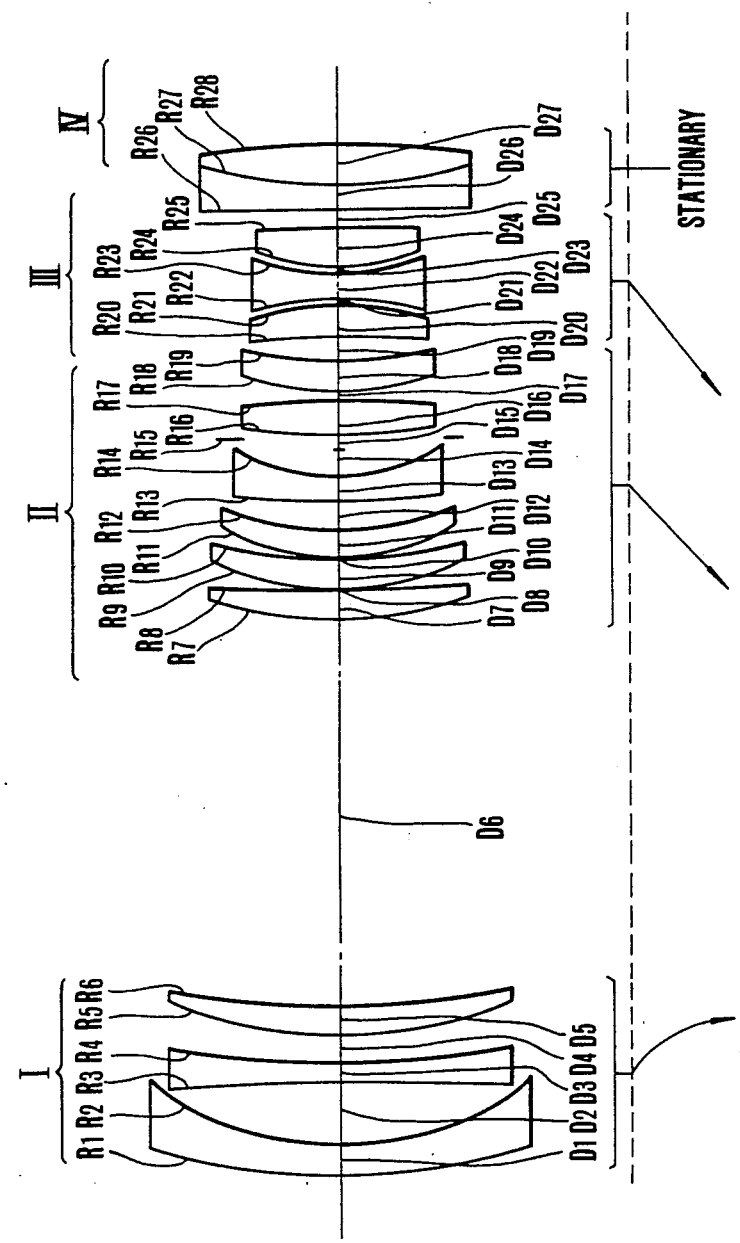
FIG. 2 is a longitudinal section view of a numerical specific example 2 of the lens based on the first embodiment of the invention.
Figure 3:
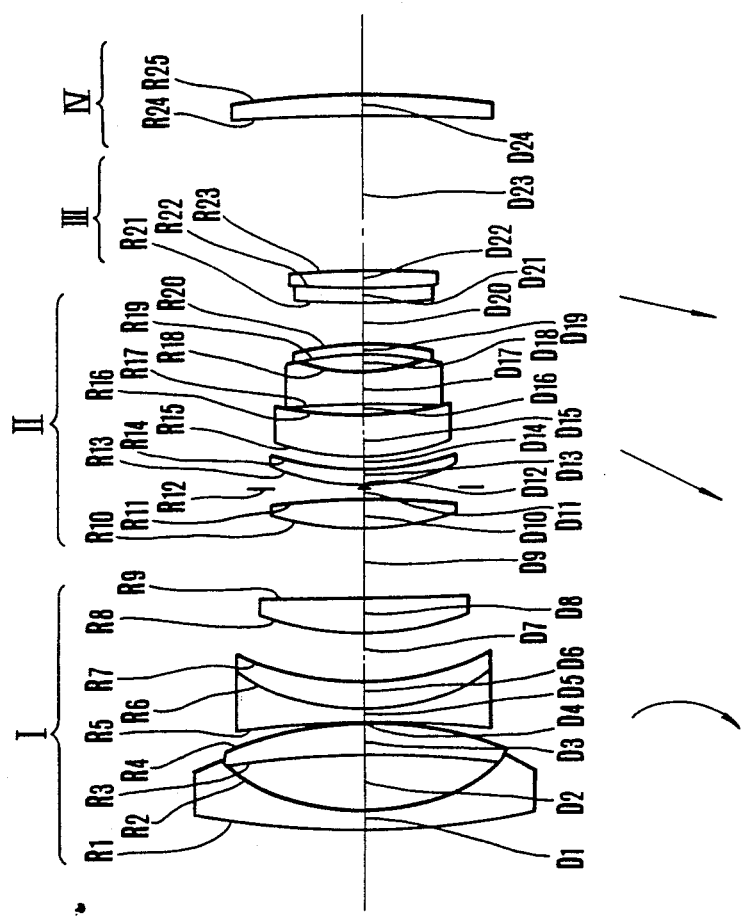
FIG. 3 is a longitudinal section view of a numerical specific example 3 of a lens based on another embodiment of the invention.
Figure 6A:
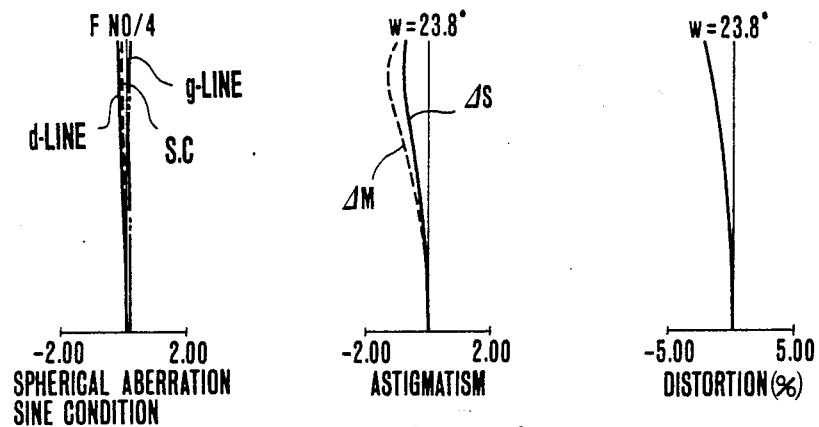
FIGS. 6(a), 6(b) and 6(c) are graphic representations of the various aberrations of the lens of FIG. 2 in the wide angle, intermediate and telephoto positions respectively.
Figure 6B:
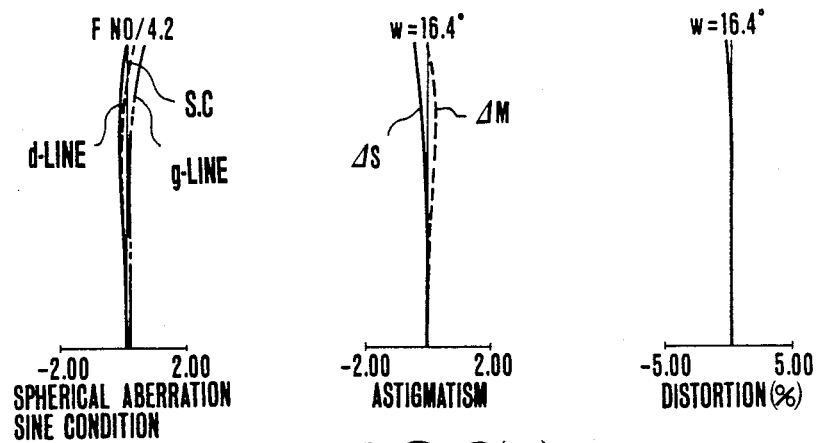
Figure 6C:
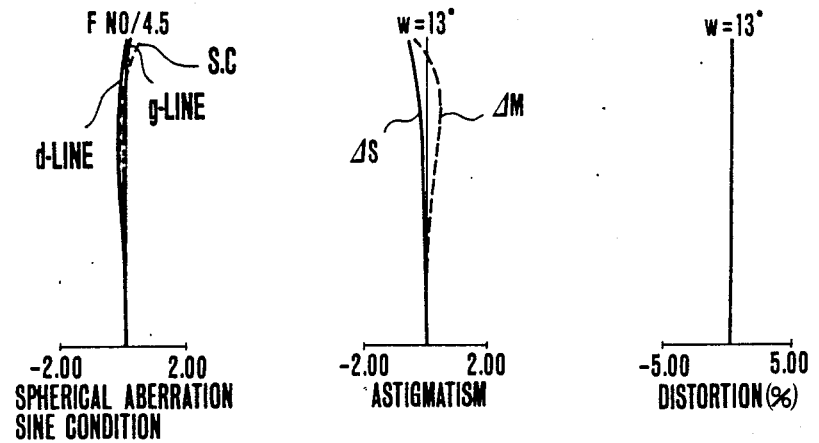
Figure 7A:
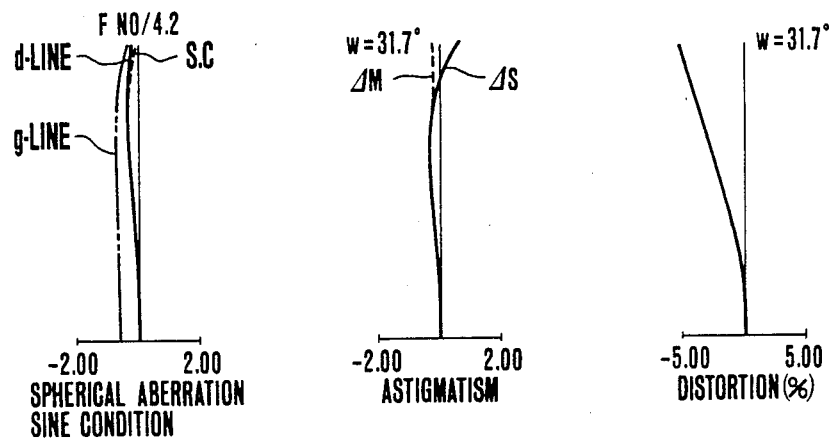
FIGS. 7(a), 7(b) and 7(c) are graphic representations of the various aberrations of the lens of FIG. 3 in the wide angle, intermediate and telephoto positions respectively.
Figure 7B:
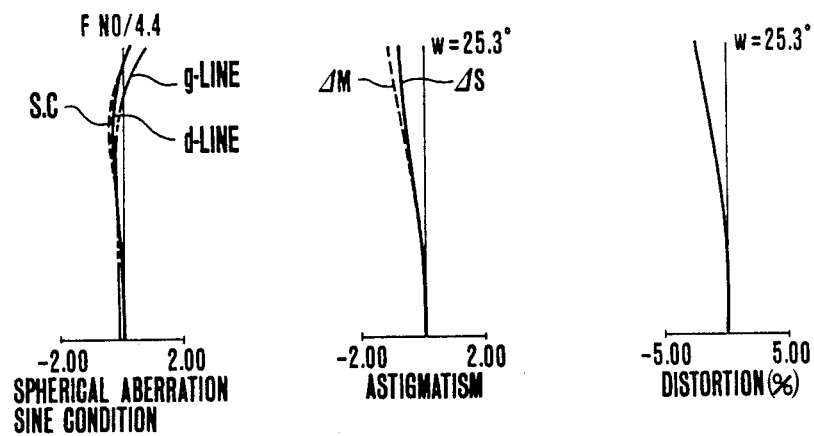
Figure 7C:
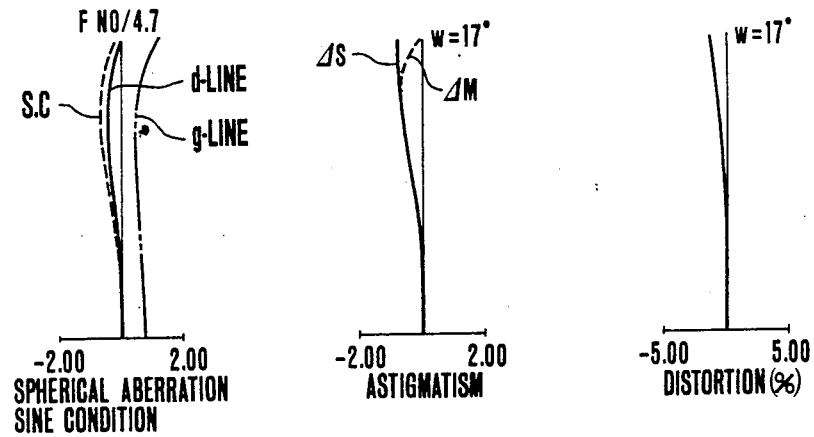
Figure 8A:
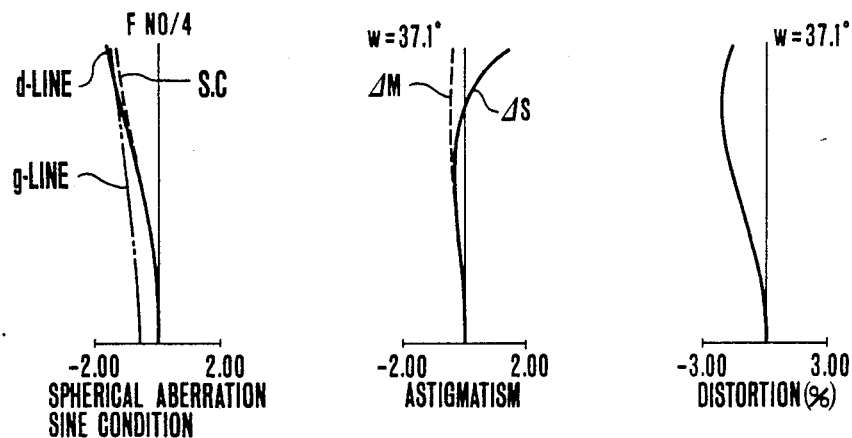
FIGS. 8(a), 8(b) and 8(c) are graphic representations of the various aberrations of the lens of FIG. 4 in the wide angle, intermediate and telephoto positions respectively.
Figure 8B:
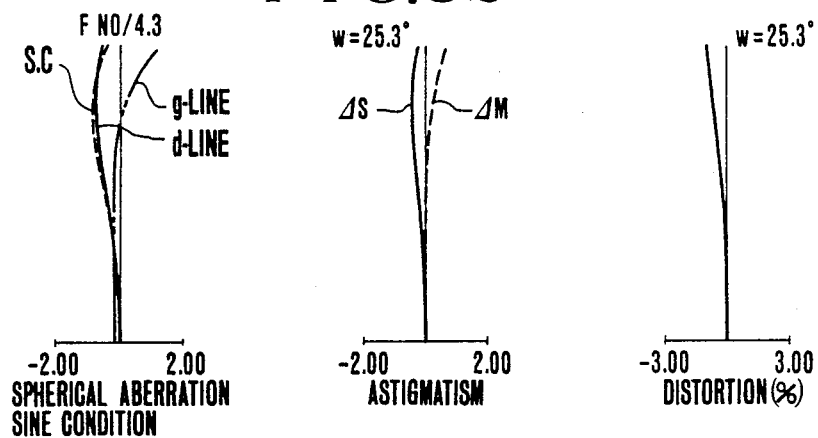
Figure 8C:
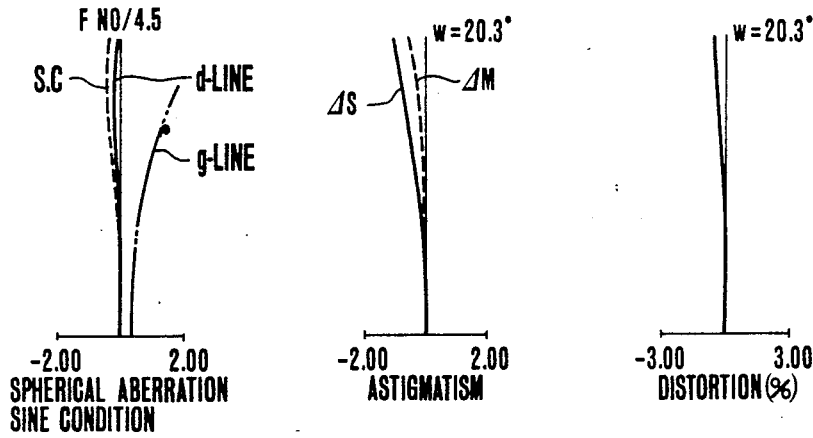

To achieve its object, the present invention has a general feature that the lens system comprises, from front to rear, a first component of negative refractive power, a second component of positive refractive power, a third component of negative or positive refractive power and a fourth component of positive refractive power. Further when zooming, the first, second and third components are moved axially but in varying relation to each other.

Further, it is preferred to design the lens system in such a way that, when zooming to the telephoto position, the first component and the second component comes closest to each other, and, when zooming to the wide angle position, the third component comes closest to the fourth component.

For the purpose of better understanding of the invention in comparison with the above-cited prior art example, an important feature of the invention is that use is made of a fourth component which is of positive power and remains stationary during zooming. Because the overall refractive power of the first to the third components is positive, the use of the fourth component of positive power provides reduction of the overall refractive power of the first to the third components from that required for the entire system, or that of the first to the fourth components. According to the present invention, therefore, the overall refractive power of the first to the third components may be taken at a weaker value than that of the overall refractive power of the above-described prior art example of the 3-component type. This results in improved results in image quality. Another feature of the invention is that, when the refractive power of the third component is negative, in order for the refractive powers of the first and second components to have the same values as those of the prior art example, the negative refractive power of the third component can take a stronger value than the prior art example. Therefore, it becomes possible to reduce the total zooming movement of each component for the equivalent zoom ratio, thereby giving an advantage of further minimizing the bulk and size of the entire system. In the alternate case, when the refractive power of the third component is positive, for the refractive power of the third component to have the same value as the prior art example, the refractive powers of the first and second components can be taken at weaker values than the prior art example. Therefore, variation of the aberrations with focusing and zooming is further reduced, and an improvement in the image quality and an increase in the relative aperture become easy to realize.

To achieve a further minimization of the bulk and size of the zoom lens, according to the present invention, the differential relation in which all the zoom components are moved is defined as follows: when zooming from the wide angle to the telephoto position, the second component is moved forward, and the third component also is moved forward but at a different speed from that of movement of the second component. By controlling the ratio of the amount of movement of the third component to that of movement of the second component, it becomes easy to make compatible the reduction of the size of the zoom lens and the improvement of the image quality.

In the case of the third component having negative refractive power, as this ratio of the amounts of movement increases, and in the case of the third component having positive refractive power, as this ratio of the amounts of movement decreases, variation with zooming of the aberrations tends to decrease. The total length of the lens system, however, (the distance from the front vertex to the film plane) at the telephoto position becomes longer, and when in a further advance, exceeds that which occurs at the wide angle position. Also in the former case, as the ratio decreases, and in the latter case, as the ratio increases, the reversed tendency to that described above takes place. It is, therefore, most preferred to make an attempt to improve the image quality under the condition that the total length of the lens system for the telephoto position does not exceed that of the lens system for the wide angle position (the limit of advance for compactness).

It is to be noted that in the case of the third component having the positive refractive power, it is desirable that the ratio of the amount of movement of the third component to the amount of movement of the second component is greater than 0.4 and smaller than 1.5. Further, since it lies in a range between 0.7 and 1.3 nearing to the specific embodiments of the invention, the compatibility of the compact form and the excellent image quality becomes readily attainable.

Since, at this time, the second component has a most important effect on the zoom ratio, for the bulk and size of the lens system to be maintained at a minimum, it is necessary to move the second component with a good efficiency. For this reason, at least in the telephoto positions, it is preferred to bring the first and second components into closest separation with each other.

Also since the third and fourth components do not have very strong refractive powers, for the total length of the lens system at the wide angle position to be shortened and the required value of the back focus to be obtained, it is preferred to bring the third and fourth components into closest separation when in the wide angle positions. In this case, the third component may be moved in whatever varying relation to the fourth component, provided that the axial separation therebetween becomes shortest when in the wide angle position.

It is to be noted that the second component may be moved not forward but rearward, and along with this the third component also may be moved rearward.

The above-stated rule of lens design suffices for accomplishing the object of the invention. But to achieve a further improvement of the stability of aberration correction with the limitation of the bulk and size to a minimum, it is required that the following various conditions be satisfied:

$$1 < f4/fT < 8 \tag{1}$$

$$0.5 < |f1|/fT < 1.2 \tag{2}$$

$$f2 < |f1| < f3 \tag{3}$$

wherein f1, f2, f3 and f4 are the focal lengths of the first, second, third and fourth components respectively and fT is the longest focal length of the entire system. When the refractive power of the third component is negative, the f3 in condition (3) becomes $|f3|$.

Conditions (1), (2) and (3) are to lay limits on the refractive power of each component, and are necessary for establishing good compromise between the requirements of reducing the bulk and size and of improving the image quality particularly when the zoom lens in question is adapted to be usable with the 35 mm single lens reflex camera. When below the lower limit of condition (1), it becomes difficult to construct the fourth component in a simple form so that an increase in the bulk and size is called for. When above the upper limit, the refractive power of the fourth component becomes too weak to produce the advantage of reducing the size and improving the image quality. When below the lower limit of condition (2), the total length of the lens system for the telephoto settings tends to be longer than that for the wide angle settings, and further it becomes difficult to achieve either an increase in the relative aperture or good correction of spherical aberration for the telephoto positions. When above the upper limit, shortening of the lens system in the longitudinal direction for the wide angle settings is not as sufficient as desired. Next, because the second component is given the duty of contributing to as large a proportion of the image magnification as possible, its refractive power must be made strongest. As for the first component, to shorten the lens system in the lateral direction, or to control the focusing range, its refractive power must be strong next to that of the second component. Because the third component is given the duty of bearing the remaining fraction of the image magnification and of stabilizing the aberrations against zooming, it is preferred that its refractive power is weaker than those of the first and second components. These are what condition (3) implies. As to the fourth component, because of its having a main function of stabilizing the aberrations against zooming, it is preferred that its refractive power is weaker than any of the refractive powers of the first, second and third components. That is, it is preferred to satisfy the following condition:

$$f2 < |f1| < f3 < f4 \tag{3}'$$

where in the case of the third component having the negative refractive power, f3 of condition (3)' should be replaced by $|f3|$.

Next, explanation is provided as to what function and advantage the fourth component of positive power has from the aberration theory standpoint.

Table 1 shows the values of the third order aberration coefficients of the numerical example 1 of the lens system (where the third component is negative), and Table 2 shows the values of the third order aberration coefficients of the numerical example 3 of the lens system (where the third component is positive). Because the fourth component remains stationary during zooming, its spherical aberration (SA) does not vary with zooming. But there are many variable aberrations as will be understood from these tables. For example, the comatic aberration (CM) varies to largest outward coma as zooming to the wide angle positions. In general, with the negative refractive power preceding zoom type, as the angular field in the wide angle position increases, and as the bulk and size reduces, inward coma tends to increase in the vicinity of the principal ray of the off-axis light bundle near the wide angle positions. The fourth component effectively functions to cancel this inward coma. In the telephoto positions, it has a small value, and, therefore, provides little bad influence. As a result, in the present invention, the use of the fourth component provides the possibility of effectively cancelling the alternating components (variable components with zooming) of the aberrations produced from the first to the third components, thus facilitating a further improvement of the image quality. Therefore, it should be recognized that the present invention is radically different in the principle of construction of the entire system from that prior art which adds a so-called rear attachment (well corrected for the aberrations in itself alone) to the 3-component zoom lens (well corrected for the aberrations in the entire system) at a space between it and the image plane to make up a 4-component zoom lens.

It should be noted that, in Tables 1 and 2, L denotes the longitudinal chromatic aberration, T the transverse chromatic aberration, SA the spherical aberration, CM the comatic aberration, AS the astigmatic aberration, PT the Petzval sum, and DS the distortional aberration.

Also, in the present invention, usually the first component is axially moved to effect focusing to different object distances. For an automatic focusing mechanism-equipped lens, or camera, focusing may be performed by either the third component or the fourth component.

Next shown are numerical specific examples of the invention. In these examples, Ri is the radius of curvature of the i-th lens surface counting from the front, Di is the i-th lens thickness or air separation counting from the front, and Ni and $\nu i$ are the refractive index and Abbe number of the glass of the i-th lens element counting from the front respectively. For note, the first and second numerical examples 1 and 2 have the third component of negative refractive power, and the third and fourth numerical examples 3 and 4 have the third component of positive refractive power.

Also, in the drawings, I is the first component, II is the second component, III is the third component and IV is the fourth component. ΔM is the meridional image surface, and ΔS is the sagittal image surface.

Example 1 has a zoom ratio 2.82:1, image angle 72.3°~29°, and F-number 1:4 with an aperture stop between the R12 and R13.

Example 2 has a zoom ratio 1.92:1, image angle 47.6°~26°, and F-number 1:4~1:4.5 with an aperture stop at the R15.

Example 3 has a zoom ratio 1.95:1, image angle 63.4°~34°, and F-number 1:4.2~1:4.7 with an aperture stop at the R15.

Example 4 has a zoom ratio 2.5:1, image angle 74.3°~40.6° and F-number 1:4~1:4.5 with an aperture stop at the R12.

| Example 1 |||| 
| --- | --- | --- | --- |
| $F = 100 - 282.4$ | $FNO = 1:4$ | $2\omega = 72.3°\sim29.0°$ ||
| R1 = 514.92 | D1 = 16.88 | N1 = 1.60311 | $\nu1$ = 60.7 |
| R2 = −19390.45 | D2 = 0.56 | | |
| R3 = 272.87 | D3 = 7.17 | N2 = 1.80400 | $\nu2$ = 46.6 |
| R4 = 80.69 | D4 = 33.01 | | |
| R5 = 1189.57 | D5 = 17.25 | N3 = 1.63636 | $\nu3$ = 35.4 |
| R6 = −224.96 | D6 = 2.90 | | |
| R7 = −201.80 | D7 = 5.24 | N4 = 1.81600 | $\nu4$ = 46.6 |
| R8 = 345.64 | D8 = 4.61 | | |
| R9 = 133.81 | D9 = 11.41 | N5 = 1.80518 | $\nu5$ = 25.4 |
| R10 = 249.78 | D10 = Variable | | |
| R11 = 153.50 | D11 = 12.68 | N6 = 1.77250 | $\nu6$ = 49.6 |
| R12 = 1331.37 | D12 = 8.25 | | |
| R13 = 103.31 | D13 = 14.68 | N7 = 1.71300 | $\nu7$ = 53.8 |
| R14 = 305.88 | D14 = 0.48 | | |
| R15 = 94.69 | D15 = 12.04 | N8 = 1.60311 | $\nu8$ = 60.7 |
| R16 = 199.18 | D16 = 5.39 | | |
| R17 = 4262.77 | D17 = 10.78 | N9 = 1.84666 | $\nu9$ = 23.9 |
| R18 = 64.24 | D18 = 10.78 | | |
| R19 = 292.13 | D19 = 12.04 | N10 = 1.74950 | $\nu10$ = 35.3 |
| R20 = −173.38 | D20 = Variable | | |
| R21 = −347.64 | D21 = 11.67 | N11 = 1.60342 | $\nu11$ = 38.0 |
| R22 = −181.94 | D22 = 6.73 | N12 = 1.79952 | $\nu12$ = 42.2 |
| R23 = 250.16 | D23 = 3.72 | | |
| R24 = 290.86 | D24 = 9.44 | N13 = 1.63980 | $\nu13$ = 34.5 |
| R25 = −290.86 | D25 = Variable | | |
| R26 = 1622.02 | D26 = 6.08 | N14 = 1.48749 | $\nu14$ = 70.1 |
| R27 = −1622.02 | | | |

| f | 100 | 192.6 | 282.4 |
| --- | --- | --- | --- |
| D10 | 157.1584 | 42.2800 | 2.6409 |
| D20 | 4.4630 | 28.4556 | 50.7707 |
| D25 | 1.6896 | 48.2642 | 91.5814 |

| | Component ||||
| --- | --- | --- | --- | --- |
| | 1st | 2nd | 3rd | 4th |
| Focal Length | f1 = −172.159 | f2 = 125.635 | f3 = −690.563 | f4 = 166.466 |

| Example 2 |||| 
| --- | --- | --- | --- |
| $F = 100 - 192$ | $FNO = 1:4\sim4.5$ | $2\omega = 47.6°\sim26°$ ||
| R1 = 164.85 | D1 = 6.03 | N1 = 1.83400 | $\nu1$ = 37.2 |
| R2 = 68.82 | D2 = 16.35 | | |
| R3 = −458.53 | D3 = 4.51 | N2 = 1.49831 | $\nu2$ = 65.0 |
| R4 = 274.35 | D4 = 6.11 | | |
| R5 = 98.76 | D5 = 7.11 | N3 = 1.80518 | $\nu3$ = 25.4 |
| R6 = 207.38 | D6 = Variable | | |
| R7 = 106.09 | D7 = 6.56 | N4 = 1.72916 | $\nu4$ = 54.7 |
| R8 = 805.39 | D8 = 0.18 | | |
| R9 = 63.09 | D9 = 7.09 | N5 = 1.72916 | $\nu5$ = 54.7 |
| R10 = 126.21 | D10 = 0.21 | | |
| R11 = 52.05 | D11 = 6.01 | N6 = 1.52542 | $\nu6$ = 64.5 |
| R12 = 62.25 | D12 = 6.95 | | |
| R13 = 181.12 | D13 = 5.55 | N7 = 1.78472 | $\nu7$ = 25.7 |
| R14 = 41.63 | D14 = 9.53 | | |
| R15 = Stop | D15 = 0.96 | | |
| R16 = 214.44 | D16 = 7.42 | N8 = 1.52542 | $\nu8$ = 64.5 |
| R17 = −250.71 | D17 = 2.01 | | |
| R18 = 67.46 | D18 = 7.63 | N9 = 1.51821 | $\nu9$ = 65.0 |

-continued
Example 2
F = 100 – 192   FNO = 1:4~4.5   2ω = 47.6°~26°

| | | | |
|---|---|---|---|
| R19 = 115.86 | D19 = Variable | | |
| R20 = −1485.62 | D20 = 7.88 | N10 = 1.65128 | ν10 = 38.3 |
| R21 = −74.56 | D21 = 1.18 | N11 = 1.65160 | ν11 = 58.6 |
| R22 = −79.40 | D22 = 5.68 | | |
| R23 = 48.99 | D23 = 2.02 | N12 = 1.64000 | ν12 = 60.1 |
| R24 = 57.20 | D24 = 8.58 | | |
| R25 = 711.14 | D25 = Variable | | |
| R26 = 2170.29 | D26 = 5.69 | N13 = 1.60342 | ν13 = 38.0 |
| R27 = 90.92 | D27 = 9.54 | N14 = 1.62299 | ν14 = 58.2 |
| R28 = −334.02 | | | |

| f | 100 | 150 | 192 |
|---|---|---|---|
| D6 | 91.362 | 28.951 | 2.378 |
| D19 | 8.972 | 8.384 | 5.871 |
| D25 | 2.043 | 38.877 | 73.327 |

| | Component | | | |
|---|---|---|---|---|
| | 1st | 2nd | 3rd | 4th |
| Focal Length | f1 = −198.263 | f2 = 103.912 | f3 = −392.094 | f4 = 425.346 |

Example 3
F = 100 – 195   FNO = 1:4.2~4.7   2ω = 34°~63.4°

| | | | |
|---|---|---|---|
| R1 = 490.01 | D1 = 12.67 | N1 = 1.72916 | ν1 = 54.7 |
| R2 = −3024.79 | D2 = 0.43 | | |
| R3 = −261.89 | D3 = 7.19 | N2 = 1.80610 | ν2 = 40.9 |
| R4 = 70.15 | D4 = 23.46 | | |
| R5 = 356.51 | D5 = 15.72 | N3 = 1.69895 | ν3 = 30.1 |
| R6 = −190.22 | D6 = 10.17 | | |
| R7 = −155.72 | D7 = 4.39 | N4 = 1.80610 | ν4 = 40.9 |
| R8 = 166.54 | D8 = 8.13 | | |
| R9 = 98.48 | D9 = 11.08 | N5 = 1.84666 | ν5 = 23.9 |
| R10 = 157.00 | D10 = Variable | | |
| R11 = 111.23 | D11 = 9.47 | N6 = 1.72916 | ν6 = 54.7 |
| R12 = 3040.15 | D12 = 0.29 | | |
| R13 = 94.23 | D13 = 10.26 | N7 = 1.62041 | ν7 = 60.3 |
| R14 = 557.28 | D14 = 2.23 | | |
| R15 = Stop | D15 = 5.76 | | |
| R16 = −198.81 | D16 = 12.66 | N8 = 1.64769 | ν8 = 33.8 |
| R17 = 69.61 | D17 = 10.04 | | |
| R18 = 780.47 | D18 = 11.11 | N9 = 1.60729 | ν9 = 49.2 |
| R19 = −102.76 | D19 = Variable | | |
| R20 = 170.66 | D20 = 11.76 | N10 = 1.71300 | ν10 = 53.8 |
| R21 = −92.94 | D21 = 5.82 | N11 = 1.59551 | ν11 = 39.2 |
| R22 = 171.64 | D22 = Variable | | |
| R23 = 216.84 | D23 = 12.33 | N12 = 1.48749 | ν12 = 70.1 |
| R24 = 409.60 | | | |

| f | 100 | 138 | 195 |
|---|---|---|---|
| D10 | 115.20 | 71.19 | 45.22 |
| D19 | 66.24 | 58.13 | 48.96 |
| D22 | 25.92 | 77.29 | 135.36 |

| | Component | | | |
|---|---|---|---|---|
| | 1st | 2nd | 3rd | 4th |
| Focal Length | f1 = −132.48 | f2 = 144.00 | f3 = 475.21 | f4 = 925.77 |

Example 4
F = 100.0 – 204.9   FNO = 1:4~4.5   2ω = 40.6°~74.3°

| | | | |
|---|---|---|---|
| R1 = 311.49 | D1 = 8.05 | N1 = 1.72000 | ν1 = 43.7 |
| R2 = 88.65 | D2 = 23.54 | | |
| R3 = −680.58 | D3 = 13.30 | N2 = 1.61293 | ν2 = 37.0 |
| R4 = −159.47 | D4 = 1.47 | | |
| R5 = −385.75 | D5 = 6.58 | N3 = 1.77250 | ν3 = 49.6 |
| R6 = 98.56 | D6 = 10.75 | N4 = 1.71736 | ν4 = 29.5 |
| R7 = 121.31 | D7 = 20.69 | | |
| R8 = 131.36 | D8 = 14.01 | N5 = 1.64769 | ν5 = 33.8 |
| R9 = 838.07 | D9 = Variable | | |
| R10 = 185.27 | D10 = 10.50 | N6 = 1.69350 | ν6 = 53.2 |
| R11 = −1228.02 | D11 = 5.60 | | |
| R12 = Stop | D12 = 1.75 | | |
| R13 = 86.16 | D13 = 8.50 | N7 = 1.60729 | ν7 = 49.2 |
| R14 = 214.69 | D14 = 3.54 | | |
| R15 = 102.55 | D15 = 19.49 | N8 = 1.61484 | ν8 = 51.2 |
| R16 = 235.12 | D16 = 2.87 | | |
| R17 = −1196.75 | D17 = 15.78 | N9 = 1.84666 | ν9 = 23.9 |
| R18 = 65.50 | D18 = 5.11 | | |
| R19 = −340.73 | D19 = 5.97 | N10 = 1.63636 | ν10 = 35.4 |
| R20 = −98.55 | D20 = Variable | | |
| R21 = 371.07 | D21 = 7.00 | N11 = 1.62588 | ν11 = 35.7 |
| R22 = 509.08 | D22 = 7.00 | N12 = 1.53113 | ν12 = 62.4 |
| R23 = 3500.11 | D23 = Variable | | |
| R24 = −918.24 | D24 = 10.50 | N13 = 1.49700 | ν13 = 81.6 |
| R25 = −260.79 | | | |

| f | 100.00 | 160.05 | 204.96 |
|---|---|---|---|
| D9 | 100.5197 | 32.3461 | 7.3700 |
| D20 | 9.5655 | 17.4659 | 23.4702 |
| D23 | 6.3468 | 66.2525 | 111.7809 |

| | Component | | | |
|---|---|---|---|---|
| | 1st | 2nd | 3rd | 4th |
| Focal Length | f1 = −157.24 | f2 = 155.07 | f3 = 739.47 | f4 = 729.02 |

TABLE 1

| | | 3rd Order Aberration Coefficient | | | | | | |
|---|---|---|---|---|---|---|---|---|
| | | L | T | SA | CM | AS | PT | DS |
| 1st Component | (Wide Angle) | −0.00067 | 0.00433 | −0.2081 | 0.1917 | −0.1399 | −0.3063 | 0.4921 |
| | (Middle) | −0.00250 | 0.00411 | −2.8645 | 0.4591 | −0.0369 | −0.3063 | 0.0833 |
| | (Telephoto) | −0.00537 | 0.00398 | −13.2432 | 0.6751 | 0.0022 | −0.3063 | 0.0304 |
| 2nd Component | (Wide Angle) | 0.01064 | −0.00429 | 3.3063 | −0.3128 | 0.2451 | 0.4172 | −0.1065 |
| | (Middle) | 0.01010 | −0.00497 | 10.3172 | −0.3851 | 0.1342 | 0.4172 | −0.0627 |

TABLE 1-continued

|  |  | 3rd Order Aberration Coefficient | | | | | | |
|---|---|---|---|---|---|---|---|---|
|  |  | L | T | SA | CM | AS | PT | DS |
|  | (Telephoto) | 0.00639 | −0.00537 | 22.7695 | −0.6724 | 0.0662 | 0.4172 | −0.0417 |
| 3rd Component | (Wide Angle) | −0.00610 | 0.00158 | −1.9626 | 0.3687 | −0.0671 | −0.0549 | −0.0329 |
|  | (Middle) | −0.00745 | 0.00132 | −3.6272 | 0.3379 | −0.0562 | −0.0549 | −0.0325 |
|  | (Telephoto) | −0.00873 | 0.00118 | −6.0297 | 0.2660 | −0.0586 | −0.0549 | −0.0305 |
| 4th Component | (Wide Angle) | 0.00136 | 0.00065 | 0.3472 | −0.0541 | −0.0320 | 0.0404 | 0.0257 |
|  | (Middle) | 0.00136 | 0.00082 | 0.3472 | −0.0104 | −0.0401 | 0.0404 | 0.0168 |
|  | (Telephoto) | 0.00136 | 0.00092 | 0.3472 | 0.0146 | −0.0398 | 0.0404 | 0.0110 |
| Total | (Wide Angle) | 0.00523 | 0.00227 | 1.4827 | 0.1935 | 0.0060 | 0.0964 | 0.3783 |
|  | (Middle) | 0.00151 | 0.00128 | 4.1726 | 0.4015 | 0.0009 | 0.0964 | 0.0047 |
|  | (Telephoto) | −0.00635 | 0.00072 | 3.8438 | 0.2833 | −0.0299 | 0.0964 | −0.0308 |

TABLE 2

|  |  | 3rd Order Aberration Coefficient | | | | | | |
|---|---|---|---|---|---|---|---|---|
|  |  | L | T | SA | CM | AS | PT | DS |
| 1st Component | (Wide Angle) | −0.0027 | 0.0041 | −0.301 | 0.218 | −0.158 | −0.415 | 0.360 |
|  | (Middle) | −0.0056 | 0.0037 | −1.297 | 0.367 | −0.104 | −0.415 | 0.120 |
|  | (Telephoto) | −0.0103 | 0.0034 | −4.398 | 0.548 | −0.068 | −0.415 | 0.046 |
| 2nd Component | (Wide Angle) | 0.0128 | −0.0022 | −0.767 | −0.185 | 0.061 | 0.356 | −0.115 |
|  | (Middle) | 0.0163 | −0.0024 | −2.402 | −0.360 | 0.006 | 0.356 | −0.080 |
|  | (Telephoto) | 0.0209 | −0.0025 | −6.931 | −0.691 | −0.038 | 0.356 | −0.056 |
| 3rd Component | (Wide Angle) | −0.0072 | −0.0022 | 2.285 | 0.134 | 0.130 | 0.072 | 0.112 |
|  | (Middle) | −0.0129 | −0.0024 | 5.822 | 0.288 | 0.169 | 0.072 | 0.069 |
|  | (Telephoto) | −0.0216 | −0.0024 | 13.923 | 0.480 | 0.189 | 0.072 | 0.039 |
| 4th Component | (Wide Angle) | 0.0025 | 0.0012 | 0.249 | −0.133 | −0.036 | 0.071 | 0.067 |
|  | (Middle) | 0.0025 | 0.0014 | 0.249 | −0.112 | −0.057 | 0.071 | 0.061 |
|  | (Telephoto) | 0.0025 | 0.0016 | 0.249 | −0.095 | −0.072 | 0.071 | 0.052 |
| Total | (Wide Angle) | 0.0054 | 0.0009 | 1.465 | 0.033 | −0.003 | 0.085 | 0.425 |
|  | (Middle) | 0.0003 | 0.0004 | 2.372 | 0.181 | 0.014 | 0.085 | 0.170 |
|  | (Telephoto) | −0.0084 | 0.0002 | 2.842 | 0.241 | 0.010 | 0.085 | 0.081 |

What we claim is:

1. A zoom lens comprising:
   from front to rear, a negative first component, a positive second component, a negative third component and a positive fourth component,
   said first, said second and said third components being moved axially independent of each other when zooming, and said fourth component remaining stationary during zooming and wherein said first and said second components are closest to each other when in the telephoto positions, and said third and said fourth components are closest to each other when in the wide angle positions and also satisfying the following conditions:

$1 < f4/fT < 8$ $0.5 < |f1|/fT < 1.2$ $f2 < |f1| < |f3|$ wherein f1, f2, f3 and f4 are the focal lengths of said first, second, third and fourth components respectively, and fT is the longest focal length of the entire system.

2. A zoom lens comprising:
   from front to rear, a negative first component, a positive second component, a positive third component and a positive fourth component,
   said first, said second and said third components being moved axially independent of each other when zooming, and said fourth component remaining stationary during zooming.

3. A zoom lens according to claim 2, wherein said first and said second components are closest to each other when in the telephoto positions, and said third and said fourth components are closest to each other when in the wide angle positions.

4. A zoom lens according to claim 3, satisfying the following conditions:

$1 < f4/fT < 8$ $0.5 < |f1|/fT < 1.2$ $f2 < |f1| < f3$ wherein f1, f2, f3 and f4 are the focal lengths of said first, second, third and fourth components respectively, and fT is the longest focal length of the entire system.

5. A zoom lens comprising:
   from front to rear, a negative first component, a positive second component, a third component and a fourth component, and
   said first, second and third components being moved axially independent of each other when zooming, and said fourth component remaining stationary during zooming and satisfying the following conditions:

$1 < f4/fT < 8$ $0.5 < f1/fT < 1.2$ $f2 < |f1| < |f3|$ wherein f1, f2, f3 and f4 are the focal lengths of said first, second, third and fourth components respectively, and fT is the longest focal length of the entire system.

6. A zoom lens comprising:
   from front to rear, a negative first component, a positive second component, a third component and a fourth component,
   said first, second and third components being moved axially independent of each other when zooming, and said fourth component remaining stationary during zooming and satisfying the following conditions:

$$0.5 < f1/fT < 1.2$$

$$f2 < |f1| < |f3|$$

wherein f1, f2 and f3 are the focal lengths of said first, second, and third components respectively, and fT is the longest focal length of the entire system.

7. A zoom lens according to claim 6, wherein said third component includes a positive lens and a negative lens.

8. A zoom lens according to claim 6, wherein said third component includes a doublet lens.

9. A zoom lens according to claim 6, wherein said fourth component is a positive lens.

10. A zoom lens according to claim 6, wherein said fourth component includes a positive lens and a negative lens.

11. A zoom lens according to claim 6, wherein said second component includes a plurality of positive lenses, a negative lens and a positive lens.

* * * * *